(12) United States Patent
Slezak et al.

(10) Patent No.: US 8,266,147 B2
(45) Date of Patent: Sep. 11, 2012

(54) METHODS AND SYSTEMS FOR DATABASE ORGANIZATION

(75) Inventors: Dominik Slezak, Warsaw (PL); Marcin Kowalski, Warsaw (PL); Victoria Eastwood, Toronto (CA); Jakub Wroblewski, Lomianki (PL)

(73) Assignee: Infobright, Inc., Toronto, Ontario (CA)

( * ) Notice: Subject to any disclaimer, the term of this patent is extended or adjusted under 35 U.S.C. 154(b) by 411 days.

(21) Appl. No.: 12/324,630

(22) Filed: Nov. 26, 2008

(65) Prior Publication Data

US 2009/0106210 A1    Apr. 23, 2009

Related U.S. Application Data

(63) Continuation-in-part of application No. 11/854,788, filed on Sep. 13, 2007, which is a continuation-in-part of application No. PCT/CA2007/001627, filed on Sep. 13, 2007.

(60) Provisional application No. 60/845,167, filed on Sep. 18, 2006.

(51) Int. Cl.
*G06F 17/30*  (2006.01)
(52) U.S. Cl. ........................... 707/737; 707/769
(58) Field of Classification Search .................. 707/737, 707/769
See application file for complete search history.

(56) References Cited

U.S. PATENT DOCUMENTS

| | | | |
|---|---|---|---|
| 5,463,772 A | 10/1995 | Thompson et al. |
| 5,551,027 A | 8/1996 | Choy et al. |
| 5,696,960 A | 12/1997 | Bhargava et al. |
| 5,794,228 A | 8/1998 | French et al. |
| 5,794,229 A | 8/1998 | French et al. |
| 5,794,246 A | 8/1998 | Sankaran et al. |
| 5,838,964 A | 11/1998 | Gubser |
| 5,873,091 A | 2/1999 | Garth et al. |
| 5,918,225 A | 6/1999 | White et al. |
| 5,938,763 A | 8/1999 | Fimoff et al. |
| 5,946,692 A | 8/1999 | Faloutsos et al. |
| 5,995,957 A | 11/1999 | Beavin et al. |
| 6,012,054 A | 1/2000 | Seputis |
| 6,014,656 A | 1/2000 | Hallmark et al. |
| 6,014,670 A | 1/2000 | Zamanian et al. |

(Continued)

FOREIGN PATENT DOCUMENTS

WO    WO 99/48018    9/1999

(Continued)

OTHER PUBLICATIONS

Abadi, Column Stores For Wide and Sparse Data, In Proceedings of the Conference on Innovative Database Research (CIDR), 2007, pp. 292-297.

(Continued)

*Primary Examiner* — Christyann Pulliam
*Assistant Examiner* — Mellissa M Chojnacki
(74) *Attorney, Agent, or Firm* — SNR Denton US LLP

(57) ABSTRACT

A relational database having a plurality of records is organized by using a processing arrangement to perform a clustering operation on the records so as to create a number of clusters. At least one of the clusters is characterized by a selected metadata parameter. The clustering operation is performed to optimize a calculated value of a selected precision factor for the selected metadata parameter. The selected metadata parameter is selected to optimize execution of a database query and the value of the selected precision factor is related to efficiency of execution of the database query.

28 Claims, 17 Drawing Sheets

U.S. PATENT DOCUMENTS

| | | | |
|---|---|---|---|
| 6,023,695 | A | 2/2000 | Osborn et al. |
| 6,029,163 | A | 2/2000 | Ziauddin |
| 6,032,148 | A | 2/2000 | Wilkes |
| 6,092,091 | A | 7/2000 | Sumita et al. |
| 6,115,708 | A * | 9/2000 | Fayyad et al. .................. 1/1 |
| 6,309,424 | B1 | 10/2001 | Fallon |
| 6,317,737 | B1 | 11/2001 | Gorelik et al. |
| 6,349,310 | B1 | 2/2002 | Klein et al. |
| 6,353,826 | B1 | 3/2002 | Seputis |
| 6,374,251 | B1 * | 4/2002 | Fayyad et al. .................. 1/1 |
| 6,470,330 | B1 * | 10/2002 | Das et al. ................ 707/718 |
| 6,477,534 | B1 | 11/2002 | Acharya et al. |
| 6,513,041 | B2 | 1/2003 | Tarin |
| 6,633,882 | B1 * | 10/2003 | Fayyad et al. .................. 1/1 |
| 6,671,772 | B1 | 12/2003 | Cousins |
| 6,691,099 | B1 | 2/2004 | Mozes |
| 6,754,221 | B1 | 6/2004 | Whitcher et al. |
| 6,865,573 | B1 | 3/2005 | Hornick et al. |
| 6,973,452 | B2 | 12/2005 | Metzger et al. |
| 7,024,414 | B2 | 4/2006 | Sah et al. |
| 7,051,038 | B1 | 5/2006 | Yeh et al. |
| 7,054,870 | B2 | 5/2006 | Holbrook |
| 7,080,081 | B2 * | 7/2006 | Agarwal et al. ............ 707/600 |
| 7,154,416 | B1 | 12/2006 | Savage |
| 7,174,343 | B2 | 2/2007 | Campos et al. |
| 7,243,110 | B2 | 7/2007 | Grondin et al. |
| 7,257,571 | B2 | 8/2007 | Turski et al. |
| 7,353,218 | B2 | 4/2008 | Aggarwal et al. |
| 7,401,104 | B2 | 7/2008 | Shah et al. |
| 7,590,641 | B1 | 9/2009 | Olson |
| 7,693,339 | B2 | 4/2010 | Wittenstein |
| 7,693,857 | B2 | 4/2010 | Dettinger et al. |
| 7,693,992 | B2 | 4/2010 | Watson |
| 7,747,585 | B2 | 6/2010 | Barsness et al. |
| 7,756,889 | B2 | 7/2010 | Yu et al. |
| 7,769,728 | B2 | 8/2010 | Ivie |
| 2001/0042167 | A1 | 11/2001 | Egawa |
| 2002/0007368 | A1 | 1/2002 | Lee et al. |
| 2003/0028509 | A1 * | 2/2003 | Sah et al. .................. 707/1 |
| 2003/0074348 | A1 | 4/2003 | Sinclair et al. |
| 2003/0120644 | A1 | 6/2003 | Shirota |
| 2004/0039729 | A1 | 2/2004 | Boger et al. |
| 2004/0111410 | A1 | 6/2004 | Burgoon et al. |
| 2005/0065911 | A1 | 3/2005 | Ellis et al. |
| 2005/0102325 | A1 | 5/2005 | Gould et al. |
| 2006/0195464 | A1 | 8/2006 | Guo |
| 2007/0203925 | A1 | 8/2007 | Sandler et al. |
| 2008/0071748 | A1 | 3/2008 | Wroblewski et al. |
| 2008/0071818 | A1 | 3/2008 | Apanowicz et al. |
| 2008/0219575 | A1 | 9/2008 | Wittenstein |
| 2008/0219582 | A1 | 9/2008 | Kirenko |
| 2008/0270363 | A1 | 10/2008 | Hunt et al. |
| 2009/0043797 | A1 * | 2/2009 | Dorie et al. .............. 707/101 |

FOREIGN PATENT DOCUMENTS

| | | |
|---|---|---|
| WO | WO 03/105489 | 12/2003 |
| WO | WO 2008/016877 | 2/2008 |

OTHER PUBLICATIONS

Aboulnaga, et al., Automated Statistics Collection in DB2 UDB, Proceedings of the 30th VLDB Conference, 2004, pp. 1158-1169.

Aggarwal, ed., Data Streams: Models and Algorithms, Springer, 2007, 364 pages.

Babu et al., Adaptive Query Processing in the Looking Glass, In Proceedings of the Conference on Innovative Database Research (CIDR), 2005, pp. 238-249.

Bhattacharjee et al., Efficient Query Processing for Multi-Dimensionally Clustered Tables in DB2, Proceedings of the 29th VLDB Conference, 2003, 12 pages.

Bohm et al., Outlier-robust Clustering using Independent Components, SIGMOD Conference '08, 2008, p. 185-198.

Boncz et al., MonetDB/X100: Hyper-Pipelining Query Execution, In Proceedings of the Conference on Innovative Database Research (CIDR), 2005, pp. 225-237.

Bruno et al., To tune or not to tune? A Lightweight Physical Design Alerter, In Proceedings of the Conference on Very Large Databases (VLDB), 2006, p. 499-510.

Cannataro et al., The knowledge grid: An Architecture for Distributed Knowledge Discovery, Commun, ACM vol. 46, No. 1, pp. 8983, 2003. [Extended 12-page version downloaded at http://grid.deis.unical.itlkgrid/].

Crochemore et al., On Compact Directed Acyclic Word Graphs, In Structures in Logic and Computer Science, Lecture notes in Computer Science 1261, Springer, 1997, pp. 192-211.

Crochermore et al., Direct Construction of Compact Directed Acyclic Word Graphs, CPM 1997, pp. 116-129.

Ester et al., A Database Interface for Clustering in Large Spatial Databases, In Proceedings of the first international Conference on Knowledge Discovery and Data Mining (KDD-95), 1995, 6 pages.

Fred et al., Data Clustering Using Evidence Accumulation, 16th International Conference on Pattern Recognition, 2002, Proceedings, vol. 4, p. 276-280.

Guting, An Introduction to Spatial Database Systems, VLDB Journal, 1994, vol. 3, p. 357-399.

Hellerstein et al., Online Aggregation, SIGMOD Conference, 1997, pp. 1-12.

Hellerstein et al., Interactive data analysis: The Control Project, IEEE Computer, 1999, pp. 51-59, vol. 3, No. 8.

Inenaga et al., On-Line Construction of Compact Directed Acyclic Word Graphs, In Proc. of $12^{th}$ Ann. Symposium on Combinatorial Pattern Matching, 2001, pp. 169-180.

Inenaga et al., On-Line Construction of Compact Directed Acyclic Word Graphs, Discrete Applied Mathematics, 2005, pp. 156-179, vol. 146, No. 2.

Infobright Analytic Data Warehouse Technology White Paper, Jun. 2008, p. 1-15.

Inmon, Information Lifecycle Management for Data Warehousing: Matching Technology to Reality—An Introduction to SAND Searchable Archive, White Paper, 2005, p. 1-14.

Jain et al., Data Clustering: A Review, ACM Computing Surveys, 1999, pp. 264-323, vol. 31, No. 3.

Kriegel et al., Potentials for Improving Query Processing in Spatial Database Systems, Institute for Computer Science, Germany, 1993, p. 1-21.

Larsson, Extended Application of Suffix Trees to Data Compression, Data Compression Conference (DCC),1996, pp. 190-199.

Macnicol et al., Sybase IW Multiplex—Designed for Analytics, In Proc. Of $30^{th}$ VLDB Conference, 2004, pp. 1227-1230.

Markl et al., Consistent selectivity estimation via maximum entropy, VLDB J., 2007, pp. 55-76, vol. 16, No. 1.

MySQL, Enterprise Data Warehousing with MySQL, Business White Paper, 2007, pp. 1-17.

MySQL, 5.1 Reference Manual: Storage Engines, downloaded from the internet at http://ldevl.mysql.com/doc/refmanl5.1/en/storage-engines.html, last accessed Nov. 28, 2007, 196 pages.

Padmanabhan et al., Multi-Dimensional Clustering: A New Data Layout Scheme in DB2, SIGMOD Conference, 2003, p. 637-641.

Pawlak et al., Rudiments of rough sets, Information Sciences, 2007, pp. 3-27, vol. 177, No. 1.

Peters et al., A Dynamic Approach to Rough Clustering, RSCTC 2008, LNAI 5306, Springer-Verlag, 2008, p. 379-388.

QD Technology, The Quick Response Database by QD Technology, A Smart Relational Database Management Solution that Enables Easy and Fast Ad Hoc Queries, White Paper, 2007, pp. 1-16.

Salomon, Data Compression, $3^{rd}$ Edition, Springer-Verlag, 2004, Ch. 2.18, pp. 134-156.

Sayood, Introduction to Data Compression, $3^{rd}$ Edition, Morgan Kaufmann, 2005, Ch. 6.3, pp. 143-152.

Shkarin, PPM: One Step to Practicality, Data Compression Conference, IEEEE Computer Society, Washington DC, 2002, 10 pages.

Slezak et al., Brighthouse: An Analytic Data Warehouse for Ad-Hoc Queries, VLDB '08, Aug. 2008, 9 pages.

Stonebraker et al., CStore: A Column Oriented DBMS, In Proc. Of the Conf. on Very Large Databases, 2005, 12 pages.

Stonebraker et al., One Size Fits All?—Part 2: Benchmarking Results, In Proc. of the Conf. on Innovative Database Res., 2007, 12 pages.

Vertica, The Vertica database, Technical Overview White Paper, 2006, 10 pages.

Zhang et al., Birch: An Efficient Data Clustering Method for Very Large Databases, SIGMOD '96, 1996, p. 103-114.

European Search Report dated May 25, 2012 in related European Application No. EP 07815821 filed Sep. 13, 2007, 8 pages.

* cited by examiner

| Record ID | A | B |
|---|---|---|
| R1 | 2 | 20 |
| R2 | 1 | 2 |
| R3 | 30 | 1 |
| R4 | 4 | 3 |
| R5 | 2 | 20 |
| R6 | 1 | 3 |
| R7 | 3 | 2 |
| R8 | 15 | 10 |
| R9 | 2 | 25 |

| CLUSTER CONTAINER X1 | | |
|---|---|---|
| ID | A | B |
| | | |
| | | |
| | | |
| | | |

| CLUSTER CONTAINER X2 | | |
|---|---|---|
| ID | A | B |
| | | |
| | | |
| | | |
| | | |

| CLUSTER CONTAINER X3 | | |
|---|---|---|
| ID | A | B |
| | | |
| | | |
| | | |
| | | |

| METADATA 1 | | |
|---|---|---|
| | A | B |
| MIN | | |
| MAX | | |
| Prec | 1 | 1 |

| METADATA 2 | | |
|---|---|---|
| | A | B |
| MIN | | |
| MAX | | |
| Prec | 1 | 1 |

| METADATA 3 | | |
|---|---|---|
| | A | B |
| MIN | | |
| MAX | | |
| Prec | 1 | 1 |

| Average prec changes | | |
|---|---|---|
| Prec | Value | # obs. |
| P(A) | 0 | 0 |
| P(B) | 0 | 0 |

FIG. 5A

| CLUSTER CONTAINER X1 | | |
|---|---|---|
| ID | A | B |
| R1 | 2 | 20 |
| | | |
| | | |
| | | |

| CLUSTER CONTAINER X2 | | |
|---|---|---|
| ID | A | B |
| | | |
| | | |
| | | |
| | | |

| CLUSTER CONTAINER X3 | | |
|---|---|---|
| ID | A | B |
| | | |
| | | |
| | | |
| | | |

| METADATA 1 | | |
|---|---|---|
| | A | B |
| MIN | 2 | 20 |
| MAX | 2 | 20 |
| Prec | 1 | 1 |

| METADATA 2 | | |
|---|---|---|
| | A | B |
| MIN | | |
| MAX | | |
| Prec | 1 | 1 |

| METADATA 3 | | |
|---|---|---|
| | A | B |
| MIN | | |
| MAX | | |
| Prec | 1 | 1 |

| Average prec changes | | |
|---|---|---|
| Prec | Value | # obs. |
| P(A) | 0 | 3 |
| P(B) | 0 | 3 |

FIG. 5B

| CLUSTER CONTAINER X1 | | |
|---|---|---|
| ID | A | B |
| R1 | 2 | 20 |
| | | |
| | | |
| | | |

| CLUSTER CONTAINER X2 | | |
|---|---|---|
| ID | A | B |
| R2 | 1 | 2 |
| | | |
| | | |
| | | |

| CLUSTER CONTAINER X3 | | |
|---|---|---|
| ID | A | B |
| | | |
| | | |
| | | |
| | | |

| METADATA 1 | | |
|---|---|---|
| | A | B |
| MIN | 2 | 20 |
| MAX | 2 | 20 |
| Prec | 1 | 1 |

| METADATA 2 | | |
|---|---|---|
| | A | B |
| MIN | 1 | 2 |
| MAX | 1 | 2 |
| Prec | 1 | 1 |

| METADATA 3 | | |
|---|---|---|
| | A | B |
| MIN | | |
| MAX | | |
| Prec | 1 | 1 |

| Average prec changes | | |
|---|---|---|
| Prec | Value | # obs. |
| P(A) | 0.083 | 6 |
| P(B) | 0.158 | 6 |

FIG. 5C

| CLUSTER CONTAINER X1 | | |
|---|---|---|
| ID | A | B |
| R1 | 2 | 20 |
| | | |
| | | |
| | | |

| CLUSTER CONTAINER X2 | | |
|---|---|---|
| ID | A | B |
| R2 | 1 | 2 |
| | | |
| | | |
| | | |

| CLUSTER CONTAINER X3 | | |
|---|---|---|
| ID | A | B |
| R3 | 30 | 1 |
| | | |
| | | |
| | | |

| METADATA 1 | | |
|---|---|---|
| | A | B |
| MIN | 2 | 20 |
| MAX | 2 | 20 |
| Prec | 1 | 1 |

| METADATA 2 | | |
|---|---|---|
| | A | B |
| MIN | 1 | 2 |
| MAX | 1 | 2 |
| Prec | 1 | 1 |

| METADATA 3 | | |
|---|---|---|
| | A | B |
| MIN | 30 | 1 |
| MAX | 30 | 1 |
| Prec | 1 | 1 |

| Average prec changes | | |
|---|---|---|
| Prec | Value | # obs. |
| P(A) | 0.270 | 9 |
| P(B) | 0.266 | 9 |

FIG. 5D $$D(X1,R4) = [(1-\frac{1}{1+(4-2)})*1+0.270*(4-1)] + [(1-\frac{1}{1+(20-3)})*1+0.266*(4-1)]$$

$$D(X2,R4) = [(1-\frac{1}{1+(4-1)})*1+0.270*(4-1)] + [(1-\frac{1}{1+(3-2)})*1+0.266*(4-1)]$$

$$D(X3,R4) = [(1-\frac{1}{1+(30-4)})*1+0.270*(4-1)] + [(1-\frac{1}{1+(3-1)})*1+0.266*(4-1)]$$

The lowest one is D(X2,R4). As a result we obtain:

| CLUSTER CONTAINER X1 | | |
|---|---|---|
| ID | A | B |
| R1 | 2 | 20 |
| | | |
| | | |
| | | |

| CLUSTER CONTAINER X2 | | |
|---|---|---|
| ID | A | B |
| R2 | 1 | 2 |
| R4 | 4 | 3 |
| | | |
| | | |

| CLUSTER CONTAINER X3 | | |
|---|---|---|
| ID | A | B |
| R3 | 30 | 1 |
| | | |
| | | |
| | | |

| METADATA 1 | | |
|---|---|---|
| | A | B |
| MIN | 2 | 20 |
| MAX | 2 | 20 |
| Prec | 1 | 1 |

| METADATA 2 | | |
|---|---|---|
| | A | B |
| MIN | 1 | 2 |
| MAX | 4 | 3 |
| Prec | .25 | .5 |

| METADATA 3 | | |
|---|---|---|
| | A | B |
| MIN | 30 | 1 |
| MAX | 30 | 1 |
| Prec | 1 | 1 |

| Average prec changes | | |
|---|---|---|
| Prec | Value | # obs. |
| P(A) | 0.401 | 12 |
| P(B) | 0.376 | 12 |

FIG. 5E $$D(X1,R5) = [(1-\frac{1}{1+(2-2)})*1+0.401*(4-1)] + [(1-\frac{1}{1+(20-20)})*1+0.376*(4-1)]$$

$$D(X2,R5) = [(.25-\frac{1}{1+(4-1)})*2+0.401*(4-2)] + [(.5-\frac{1}{1+(20-2)})*2+0.376*(4-2)]$$

$$D(X3,R5) = [(1-\frac{1}{1+(30-2)})*1+0.401*(4-1)] + [(1-\frac{1}{1+(20-1)})*1+0.376*(4-1)]$$

The lowest one is D(X1,R5). As a result we obtain:

| CLUSTER CONTAINER X1 | | |
|---|---|---|
| ID | A | B |
| R1 | 2 | 20 |
| R5 | 2 | 20 |
| | | |
| | | |

| CLUSTER CONTAINER X2 | | |
|---|---|---|
| ID | A | B |
| R2 | 1 | 2 |
| R4 | 4 | 3 |
| | | |
| | | |

| CLUSTER CONTAINER X3 | | |
|---|---|---|
| ID | A | B |
| R3 | 30 | 1 |
| | | |
| | | |
| | | |

| METADATA 1 | | |
|---|---|---|
| | A | B |
| MIN | 2 | 20 |
| MAX | 2 | 20 |
| Prec | 1 | 1 |

| METADATA 2 | | |
|---|---|---|
| | A | B |
| MIN | 1 | 2 |
| MAX | 4 | 3 |
| Prec | 0.25 | 0.5 |

| METADATA 3 | | |
|---|---|---|
| | A | B |
| MIN | 30 | 1 |
| MAX | 30 | 1 |
| Prec | 1 | 1 |

| Average prec changes | | |
|---|---|---|
| Prec | Value | # obs. |
| P(A) | 0.385 | 15 |
| P(B) | 0.393 | 15 |

FIG. 5F $$D(X1,R6) = [(1-\frac{1}{1+(2-1)})*2+0.385*(4-2)] + [(1-\frac{1}{1+(20-3)})*2+0.393*(4-2)]$$

$$D(X2,R6) = [(..25-\frac{1}{1+(4-1)})*2+0.385*(4-2)] + [(.5-\frac{1}{1+(3-2)})*2+0.393*(4-2)]$$

$$D(X3,R6) = [(1-\frac{1}{1+(30-1)})*1+0.385*(4-1)] + [(1-\frac{1}{1+(3-1)})*1+0.393*(4-1)]$$

The lowest one is D(X2,R6). As a result we obtain:

| CLUSTER CONTAINER X1 | | |
|---|---|---|
| ID | A | B |
| R1 | 2 | 20 |
| R5 | 2 | 20 |
| | | |
| | | |

| CLUSTER CONTAINER X2 | | |
|---|---|---|
| ID | A | B |
| R2 | 1 | 2 |
| R4 | 4 | 3 |
| R6 | 1 | 3 |
| | | |

| CLUSTER CONTAINER X3 | | |
|---|---|---|
| ID | A | B |
| R3 | 30 | 1 |
| | | |
| | | |
| | | |

| METADATA 1 | | |
|---|---|---|
| | A | B |
| MIN | 2 | 20 |
| MAX | 2 | 20 |
| Prec | 1 | 1 |

| METADATA 2 | | |
|---|---|---|
| | A | B |
| MIN | 1 | 2 |
| MAX | 4 | 3 |
| Prec | 0.25 | 0.5 |

| METADATA 3 | | |
|---|---|---|
| | A | B |
| MIN | 30 | 1 |
| MAX | 30 | 1 |
| Prec | 1 | 1 |

| Average prec changes | | |
|---|---|---|
| Prec | Value | # obs. |
| P(A) | 0.403 | 18 |
| P(B) | 0.417 | 18 |

FIG. 5G $$D(X1,R7) = [(1-\frac{1}{1+(3-2)})*2+0.403*(4-2)] + [(1-\frac{1}{1+(20-2)})*2+0.417*(4-2)]$$

$$D(X2,R7) = [(.25-\frac{1}{1+(4-1)})*3+0.403*(4-3)] + [(.5-\frac{1}{1+(3-2)})*3+0.417*(4-3)]$$

$$D(X3,R7) = [(1-\frac{1}{1+(30-3)})*1+0.403*(4-1)] + [(1-\frac{1}{1+(2-1)})*1+0.417*(4-1)]$$

The lowest one is D(X2,R7). As a result we obtain:

| CLUSTER CONTAINER X1 | | |
|---|---|---|
| ID | A | B |
| R1 | 2 | 20 |
| R5 | 2 | 20 |
| | | |
| | | |

| CLUSTER CONTAINER X2 | | |
|---|---|---|
| ID | A | B |
| R2 | 1 | 2 |
| R4 | 4 | 3 |
| R6 | 1 | 3 |
| R7 | 3 | 2 |

| CLUSTER CONTAINER X3 | | |
|---|---|---|
| ID | A | B |
| R3 | 30 | 1 |
| | | |
| | | |
| | | |

| METADATA 1 | | |
|---|---|---|
| | A | B |
| MIN | 2 | 20 |
| MAX | 2 | 20 |
| Prec | 1 | 1 |

| METADATA 2 | | |
|---|---|---|
| | A | B |
| MIN | 1 | 2 |
| MAX | 4 | 3 |
| Prec | 0.25 | 0.5 |

| METADATA 3 | | |
|---|---|---|
| | A | B |
| MIN | 30 | 1 |
| MAX | 30 | 1 |
| Prec | 1 | 1 |

| Average prec changes | | |
|---|---|---|
| Prec | Value | # obs. |
| P(A) | 0.415 | 21 |
| P(B) | 0.426 | 21 |

FIG. 5H

| CLUSTER CONTAINER X1 | | |
|---|---|---|
| ID | A | B |
| R1 | 2 | 20 |
| R5 | 2 | 20 |
| | | |
| | | |

| CLUSTER CONTAINER X2 | | |
|---|---|---|
| ID | A | B |
| | | |
| | | |
| | | |
| | | |

| CLUSTER CONTAINER X3 | | |
|---|---|---|
| ID | A | B |
| R3 | 30 | 1 |
| | | |
| | | |
| | | |

| METADATA 1 | | |
|---|---|---|
| | A | B |
| MIN | 2 | 20 |
| MAX | 2 | 20 |
| Prec | 1 | 1 |

| METADATA 2 | | |
|---|---|---|
| | A | B |
| MIN | | |
| MAX | | |
| Prec | 1 | 1 |

| METADATA 3 | | |
|---|---|---|
| | A | B |
| MIN | 30 | 1 |
| MAX | 30 | 1 |
| Prec | 1 | 1 |

| Average prec changes | | |
|---|---|---|
| Prec | Value | # obs. |
| P(A) | 0.415 | 21 |
| P(B) | 0.426 | 21 |

FIG. 5I $$D(X1,R8) = [(1-\frac{1}{1+(15-2)})*2+0.415*(4-2)] + [(1-\frac{1}{1+(20-10)})*2+0.426*(4-2)] = 5.36$$

$$D(X2,R8) = .415*4 + .426*4 = 3.36$$

$$D(X3,R8) = [(1-\frac{1}{1+(30-15)})*1+0.415*(4-1)] + [(1-\frac{1}{1+(10-9)})*1+0.426*(4-1)] = 3.96$$

The lowest one is D(X2,R8). As a result we obtain:

| CLUSTER CONTAINER X1 | | |
|---|---|---|
| ID | A | B |
| R1 | 2 | 20 |
| R5 | 2 | 20 |
|  |  |  |
|  |  |  |

| CLUSTER CONTAINER X2 | | |
|---|---|---|
| ID | A | B |
| R8 | 15 | 10 |
|  |  |  |
|  |  |  |
|  |  |  |

| CLUSTER CONTAINER X3 | | |
|---|---|---|
| ID | A | B |
| R3 | 30 | 1 |
|  |  |  |
|  |  |  |
|  |  |  |

| METADATA 1 | | |
|---|---|---|
|  | A | B |
| MIN | 2 | 20 |
| MAX | 2 | 20 |
| Prec | 1 | 1 |

| METADATA 2 | | |
|---|---|---|
|  | A | B |
| MIN | 15 | 10 |
| MAX | 15 | 10 |
| Prec | 1 | 1 |

| METADATA 3 | | |
|---|---|---|
|  | A | B |
| MIN | 30 | 1 |
| MAX | 30 | 1 |
| Prec | 1 | 1 |

| Average prec changes | | |
|---|---|---|
| Prec | Value | # obs. |
| P(A) | 0.441 | 24 |
| P(B) | 0.432 | 24 |

FIG. 5J $$D(X1,R9) = [(1-\frac{1}{1+(2-2)})*2+0.441*(4-2)] + [(1-\frac{1}{1+(25-20)})*2+0.432*(4-2)] = 3.41$$

$$D(X2,R9) = [(1-\frac{1}{1+(15-2)})*1+0.441*(4-1)] + [(1-\frac{1}{1+(25-10)})*1+0.432*(4-1)] = 4.49$$

$$D(X3,R9) = [(1-\frac{1}{1+(30-2)})*1+0.441*(4-1)] + [(1-\frac{1}{1+(25-1)})*1+0.432*(4-1)] = 4.54$$

The lowest one is D(X1, R9). As a result we obtain:

| CLUSTER CONTAINER X1 | | |
|---|---|---|
| ID | A | B |
| R1 | 2 | 20 |
| R5 | 2 | 20 |
| R9 | 2 | 25 |
| | | |

| CLUSTER CONTAINER X2 | | |
|---|---|---|
| ID | A | B |
| R8 | 15 | 10 |
| | | |
| | | |
| | | |

| CLUSTER CONTAINER X3 | | |
|---|---|---|
| ID | A | B |
| R3 | 30 | 1 |
| | | |
| | | |
| | | |

| METADATA 1 | | |
|---|---|---|
| | A | B |
| MIN | 2 | 20 |
| MAX | 2 | 25 |
| Prec | 1 | .167 |

| METADATA 2 | | |
|---|---|---|
| | A | B |
| MIN | 15 | 10 |
| MAX | 15 | 10 |
| Prec | 1 | 1 |

| METADATA 3 | | |
|---|---|---|
| | A | B |
| MIN | 30 | 1 |
| MAX | 30 | 1 |
| Prec | 1 | 1 |

| Average prec changes | | |
|---|---|---|
| Prec | Value | # obs. |
| P(A) | 0.462 | 27 |
| P(B) | 0.485 | 27 |

FIG. 5K

METHODS AND SYSTEMS FOR DATABASE ORGANIZATION

CROSS REFERENCE TO RELATED APPLICATION

This application is a continuation in part of U.S. application Ser. No. 11/854,788, filed Sep. 13, 2007, which claims priority from U.S. Provisional Application No. 60/845,167 filed Sep. 18, 2006. This application is also a continuation in part of PCT/CA2007/001627 filed Sep. 13, 2007; and is related to U.S. application Ser. No. 11/843,019 filed Aug. 22, 2007. The content of each of the foregoing applications is hereby incorporated by reference into the present patent application in its entirety.

FIELD OF THE INVENTION

The present disclosure relates generally to relational database management systems (RDBMS) and more particularly to methods and systems for optimizing the organization of a relational database so as to improve the efficiency of executing queries on the database.

BACKGROUND

Databases and database management systems are being implemented in more and more businesses, organizations and institutions, and are being used to store and manage increasingly large amounts of data of increasingly different types and complexity. It is a continuing objective to increase or maintain the speed of responding to data search queries and data analysis tasks in the face of at least the following trends:

Increased diversity in user needs
Increased demands for ad hoc and complex decision support queries vs. standard canned reports
Need for more "real time" information
Rapidly growing volumes of data As a result, there is a need for improved database management solutions to facilitate rapid execution of database queries.

Traditional approaches to database organization fail to effectively deliver a solution to such diverse requirements because of high computational cost, and slow query performance against large volumes of data. As evidenced, for example, in Fayyad, et al., U.S. Pat. No. 6,374,251 ("Fayyad"), there is an acute, largely unsolved, challenge to sift through large databases in search of useful information in a reasonable amount of time, especially where the database size may be much larger than the available computer memory.

In U.S. application Ser. No. 11/854,788, filed Sep. 13, 2007, and assigned to the assignee of the present application, metadata parameters of various types (referred to therein as data information units, data pack nodes, knowledge nodes and/or statistical data elements) were disclosed as means for characterizing the content of data units where the data units were, for example, a group of data from a single category (or column) extracted from a group of data records. The disclosed method enabled faster processing of a data query by, inter alia, using the metadata parameters to avoid searching individual data records (or fractions thereof) when the metadata parameter indicated those records (or fractions thereof) would not contain data responsive to the data query. Thus, the metadata parameter improved planning and execution of data query operations, irrespective of how the data records were ordered.

Some known methods organize databases by partitioning data into smaller blocks to assist in subsequent data operations. Partitioning may provide for a physical data model design aimed at organization and enhancement of the data transparently to the logical data model layout. Such physical data model design approaches are generally based on certain assumptions about the way users will use the system and usually leave the tuning task to the database administrator (DBA). Some known approaches attempt to analyze automatically the data and query samples to assist the DBA as a kind of decision support tool while others attempt to alert the DBA during the system's operation whenever the users' requirements have changed significantly enough to reconsider the current design.

However, dynamic changes in the users' requirements are not handled sufficiently flexibly by such existing tools. In particular, there is a lack of flexibility in known RDBMS data partitioning techniques, which split the data into separate groups defined in terms of distinct values or ranges of some columns or functions. Such partitioning criteria are so closely related to specific query and data patterns that any change in the query workload or incoming data may cause a significant decrease in the query performance until the data is re-partitioned.

Furthermore, dynamic changes in the database itself, as a result of arrival of new data, are handled inefficiently by such existing methods. For example, in the case where a user of a RDBMS wants to run queries immediately after new portions of data are loaded into the previously existing data sets, it is not acceptable that recalculation of the data structures over the old data merged with the new data takes a larger amount of time. Instead, there is a growing expectation that both old and newly arriving data should be available for efficient querying as it arrives and without delay.

Techniques of data mining known in the art as "cluster analysis" look for relations between data elements in a set of data records. Cluster analysis has been defined as "the organization of a collection of patterns (usually represented as a vector of measurements, or a point in a multidimensional space) into clusters based on similarity." Jain, A. K., et al., *Data Clustering: A Review*, ACM Computing Surveys, Vo. 31, NO. 3, September 1999. Data "clustering" in the context of data mining has the objective of grouping similar data items into clusters that would be practically meaningful to the end users of a data mining system. Such methods seek to extract useful information from an essentially unordered (or randomly ordered) set of records by finding relationships between data items. As noted above, present methods of applying such techniques to large databases are costly in terms of execution time and computer resources.

Accordingly, what are needed are improved methods and systems for optimizing the organization of a relational database so as to improve the efficiency of executing search queries on the database.

SUMMARY OF THE INVENTION

The present inventors have mitigated the aforementioned problems with techniques that improve query execution efficiency, particularly of very large relational databases, by clustering records in the database so as to optimize associated metadata parameters with respect to query execution efficiency. The techniques are effective when practiced prior to or upon receipt of a query and may be practiced on a database during or after load.

In an embodiment, a relational database is organized by using a processing arrangement to perform a clustering operation on database records so as to create data clusters, at least one data cluster being characterized by a selected metadata parameter. The clustering operation optimizes a calculated value of a selected precision factor for the selected metadata parameter.

In a further embodiment, the selected metadata parameter is selected to optimize execution of a database query.

In another embodiment, the value of the selected precision factor is related to efficiency of execution of a database query.

In yet a further embodiment, a data unit consisting of a plurality of data elements in the database is characterized by the selected metadata parameter. The selected metadata parameter identifies: a minimum value of all data elements in the data unit, a maximum value of all data elements in the data unit, a number of non-null values found within the data elements in the data unit; a histogram mapping an occurrence of at least one value in the data unit, information about occurrence of a character in an alphanumeric string, and/or a total value of the data elements in the data unit.

In an embodiment, the precision factor measures effectiveness of the metadata parameter in maximizing efficiency of a database query.

In a further embodiment, the clustering operation consists of a first clustering operation and a second clustering operation, and the second clustering operation is performed only when the second clustering operation is predicted to improve the value of the selected precision factor by at least a selected threshold amount. Moreover, the selected metadata parameter may be a first selected metadata parameter and the at least one of said plurality of clusters may be characterized by the first selected metadata parameter and a second selected metadata parameter such that the selected precision factor is a first selected precision factor for the first metadata parameter and a second selected precision factor for the second metadata parameter. The first selected metadata parameter may have a first weighting factor applied to the first selected precision factor and the second selected metadata parameter may have a second weighting factor applied to the second selected precision factor. A cluster quality parameter may consist of a sum of the weighted first selected precision factor and the weighted second selected precision factor. Each of the first and second clustering operations improves the cluster quality parameter.

In a further embodiment the method is repeated when a change occurs to at least one of the relational database and parameters related to the relational database. Moreover, the change may consist of a change to an existing record, addition of a record, and/or deletion of a record. Furthermore, the change may consist of a change in value of at least one of a metadata parameter, a precision factor, a weighting factor, and/or a cluster quality parameter.

In yet another embodiment, performing a clustering operation consists of assigning a first record to a first cluster container, the first cluster container being one of a selected number of cluster containers; assigning each subsequent record to a selected one of (a) the first cluster container and (b) a different cluster container, and the selection is made so as to maximize an average value of the selected precision factor. Moreover, the selected number of cluster containers may be adjusted in response to at least one of (i) a speed of executing the method and (ii) the selected precision factor average value. Furthermore, each cluster container may have a selectable maximum size that may be adjusted in response to at least one calculated value of a precision factor of the cluster container. In addition, the selection may be made so as to improve a cluster quality parameter, the cluster quality parameter consisting of a product of a weighting factor and the selected precision factor, and the weighting factor corresponding to an average historical in value of the selected precision factor.

In an embodiment, a relational database is organized by duplicating a plurality of records in the relational database so as to create at least a first and a second plurality of records, the first plurality of records being identical to the second plurality of records; performing a first clustering operation on each of the first plurality of records and second plurality of records so as to create a first plurality of clusters and a second plurality of clusters, each cluster in the plurality of clusters characterized by at least one respective metadata parameter, each respective metadata parameter having an associated precision factor, each associated precision factor having a respective weighting factor applied thereto, such that the first clustering operation maximizes a calculated value of a weighted selected precision factor; and, responsive to a database query, executing the database query on a selected one of the first plurality of records and the second plurality of records, the selection being made on the basis of a correlation between a property of the query and the calculated value of the selected precision factor for each of the first plurality of records and the second plurality of records.

In another embodiment, a query of a relational database is executed on a relational database, by using a processing arrangement to perform a clustering operation on database records so as to create a data cluster, at least one data cluster being characterized by a selected metadata parameter. The clustering operation optimizes a calculated value of a selected precision factor for the selected metadata parameter, the metadata parameter optimizes the query, and the processing arrangement returns a response to the query.

In a further embodiment, computer readable instructions stored on a computer-usable medium for execution by a processor perform a method of organizing a relational database by performing a clustering operation on database records so as to create data clusters, at least data cluster being characterized by a selected metadata parameter. The clustering operation optimizes a calculated value of a selected precision factor for the selected metadata parameter.

BRIEF DESCRIPTION OF THE DRAWINGS

The present invention is illustrated by way of example, and not limitation, in the figures of the accompanying drawings, in which:

FIG. 4 illustrates an example database;

FIGS. 5a-5k illustrate an exemplary process of clustering records from the database illustrated in FIG. 4;

DETAILED DESCRIPTION

Figure 1:
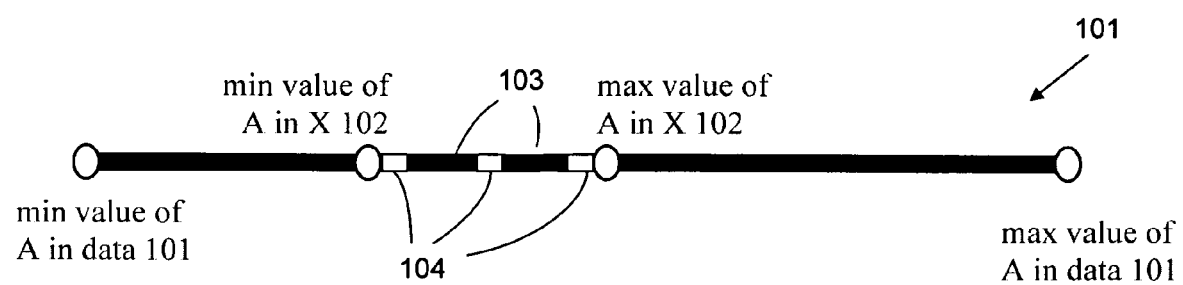
FIG. 1 is an example illustrating data homogeneity as the term may be applied in an embodiment.

Methods and systems for optimizing the organization of a relational database (RDB) so as to improve the efficiency of executing search queries on the database will now be described. Optimizing the organization of a database may mean grouping (or "clustering") data records belonging to the RDB in such a way that data synopses computed for selected data groups are, on average, most useful to the conduct of searches. Such data synopses are referred to as "metadata parameters" in the present specification and claims. A measure of the "usefulness" of a metadata parameter is referred to hereinafter, in the specification and claims, as a "precision factor". A precision factor may characterize, for example, the homogeneity of data within a data unit, and be calculated from information contained within the metadata parameters.

Query execution performance may be enhanced by clustering RDB records into more optimal groups. "Clustering", as the term is used hereinafter in the specification and the claims, refers to the grouping and/or regrouping of data records within the RDB. As such, the term is to be distinguished from "data clustering" as described in Jain, and other works on data mining. As described in Jain, for example, data clustering has the objective of finding and selecting records from within an essentially unordered (or arbitrarily ordered) database, the selected records characterized in that similar data items may be grouped into clusters that would be practically meaningful to the end users of a data mining system. Such methods extract data from an essentially unordered (or arbitrarily ordered) set of records with an objective of finding relationships between data items, and are not concerned with structuring the database itself to facilitate execution of queries.

As described in more detail hereinbelow, the metadata parameters, and the RDB itself, may be updated dynamically taking into account changes to user query statistics and to the database itself. In an embodiment, optimizing may be performed on-line, that is, even while new data records are arriving and may be performed transparently to any ongoing user queries.

In an embodiment, a method of organizing an RDB includes using a processing arrangement to perform a clustering operation on records of the RDB so as to create two or more "clusters" of records, at least one of which is characterized by a selected metadata parameter such that a calculated value of a selected precision factor for the selected metadata parameter is optimized.

Metadata Parameters

Metadata parameters may provide a descriptive synopsis of data making up a subset of a RDB. For example, metadata may include a set of statistics about the data subset. In an embodiment, the data subset may be associated with one or more columns a column-oriented RDB. Advantageously, the data subset may be compressed, using methods known in the art appropriate to the type of data stored in a particular column.

A RDB may include one or more data clusters. In some embodiments, referring now to FIG. 2, the RDB may be a column-oriented database 2001, and each cluster 221 may represent column data from a base table. The clusters 221 may include compressed data representing the records or entries in the respective column. In some embodiments, the clusters 221 may contain data concerning up to $2^{16}$ (approximately 65.5 K) consecutive records of which some values may be null. Depending on its size, the column may be stored in more than one cluster (e.g., if there are more than 65.5 K records). The clusters 221 may be compressed, and may contain more or less records than discussed here, depending on the application. In an embodiment, clusters may be compressed using techniques described in U.S. application Ser. No. 11/843,019.

Metadata parameters 222 may store information about data elements in a cluster 221, such as basic statistical or analytical information associated with each cluster 221 in the RDB. In some embodiments, there may be one metadata parameter 222 for each cluster 221. Each metadata parameter 222 may contain basic information (e.g., statistics) about its respective cluster 221. The particular information maintained in the metadata parameter 222 for each cluster 221 may depend on the particular data type of the respective cluster 221. Typically, the size of each metadata parameter 222 may be small and so the metadata parameter 222 may be not compressed. As compared to conventional indices used in RDB, such metadata parameters require much less overhead, because they are operative on clusters rather than rows. The present inventors have found, for example, that the overhead of metadata parameters may be as little as 1% of the RDB size, even after compression of the RDB. Conventional indices, by way of comparison, may typically represent overhead on the order of 20-50%.

Generally, data types may be at least one of: a string, a numeric value, a floating point value, or a binary value. A compression algorithm may be selected for each of these four primary data types. In some aspects, within each of these four primary data types there may be sub-types (e.g., large string, short string, date, or other) for which different compression algorithms may be selected.

In an example of numerical data types, the metadata parameter 222 for cluster 221 may include: the number of non-null values in the respective cluster 221, the minimum and maximum values in the respective cluster 221, and the sum of values in the respective cluster 221. In the case of non-numerical data types, the metadata parameter may include, for example, lexicographic minimum and maximum or the largest common prefix (e.g., the longest sub-string that is common to all strings) for a cluster 221. If all non-null values in the cluster 221 are the same, the metadata parameter 222 may store only the statistical information and positions of nulls. In some embodiments, additional or different information may be included in the metadata parameter 222. Further, other information about the respective cluster 221 may be derived from the information in the metadata parameter 222. For example, the average value may be derived directly from the number of non-null values and the sum of values which are both stored in the metadata parameter 222 of the example.

A metadata parameter 222 may be associated with one or more clusters 221, one or more columns, one or more tables, or a combination thereof. A metadata parameter 222 may include analytical information about the data elements stored in one or more clusters 221, one or more columns, one or more tables, or a combination thereof, information about relationships between data elements in multiple clusters 221, information about relationships between data elements in different columns in a base table, and/or relationships between data elements in columns in different base tables. For example, a metadata parameter may consist of information about correlation of data elements in a data unit with data element of at least one other data unit. Moreover, a metadata parameter may identify common occurrence of at least one value in a first data unit and a second data unit. A metadata parameter 222 may be dynamic and may change over time. Moreover, a metadata parameter may include more than simple statistics such as min and max values within a cluster. For example, a metadata parameter may include a histogram that maps the occurrence of particular values in a particular cluster. Such a histogram may enable quick and precise determination of whether a particular value occurs in a cluster without the need to decompress the cluster itself. Analogously, basic information about alphanumeric data may be extended by storing information about the occurrence of particular characters in particular positions in the cluster.

A metadata parameter 222 may be used in query planning and execution, and may allow minimization of the need to access the data stored in the respective data cluster 221 during query execution, as will be described in more detail below.

As discussed above, large databases may be organized as clusters, each cluster containing, for example, 2^16≈65.5 K records. Thus, for example, for a table T with columns A and B, and 300,000 records, the following clusters may be provided:

Cluster 1: values of column A and Column B for row nos. 1-65.5 K
Cluster 2: values of column A and Column B for row nos. 65.5 K-131 K
Cluster 3: values of column A and Column B for row nos. 131.1 K-196.6 K
Cluster 4: values of column A and Column B for row nos. 196.6 K-262.1 K
Cluster 5: values of column A and Column B for row nos. 262.1 K-300 K Analytical information about each cluster may be collected and stored as metadata parameters. For example, for the following table I, assume that both A and B store some numeric values. The following table should be read as follows: for the first 65.5K rows in T the minimum value of A is 0, maximum is 5, the sum of values on A for the first 65.5K rows is 10,000.

TABLE I

| Cluster | Metadata of Col. A | | | Metadata of Col. B | | |
| --- | --- | --- | --- | --- | --- | --- |
| Number | Min | Max | Sum | Min | Max | Sum |
| 1 | 0 | 5 | 10000 | 0 | 5 | 1000 |
| 2 | 0 | 2 | 2055 | 0 | 2 | 100 |
| 3 | 7 | 8 | 500000 | 0 | 1 | 100 |
| 4 | 0 | 5 | 30000 | 0 | 5 | 100 |
| 5 | −4 | 10 | 12 | −15 | 0 | −40 |

Metadata parameters may be accessible without a need to decompress data in the corresponding clusters. In an embodiment, whenever a query may require access to (and decompression of) data stored in a given cluster the method first examines a corresponding metadata parameter to determine if decompression of the contents is really necessary. In many cases, information contained in a metadata parameter is enough to optimize and execute a query.

In other cases, because decompressing a cluster is substantially faster than decompressing an entire database, and metadata parameters provide a mechanism for identifying the clusters which need to be decompressed in response to a query, query execution efficiency is substantially improved.

For example, upon receiving a query, clusters may be categorized as "relevant", "irrelevant", or "suspect" according to the following criteria:

Relevant cluster—in which each element in the cluster is identified, based on its metadata parameter(s), as applicable to the query.
Irrelevant cluster—based on its metadata parameter(s), the cluster holds no relevant values.
Suspect cluster some elements may be relevant, but it is not possible to determine whether the cluster is either fully relevant or fully irrelevant, based on its metadata parameter(s).

In executing a query, it is not necessary to decompress either Relevant or Irrelevant clusters. Irrelevant clusters may be simply not taken into account at all. In case of Relevant clusters, we know that all elements are relevant, and the required answer is obtainable—at least for a large number of types of analytic queries—from a metadata parameter without a need to decompress the cluster.

For example, using the metadata parameters provided in Table I consider the following SQL query statement:

Query 1: SELECT SUM(B) FROM T WHERE A>6;

Clusters A1, A2, and A4 are Irrelevant—none of the data can satisfy A>6 because all these clusters have maximum values below 6. Consequently, clusters B1, B2, and B4 need not be analyzed while calculating SUM(B)— they are Irrelevant too.

Cluster A3 is Relevant—all the data elements satisfy A>6. As a result cluster B3 is Relevant as well. The sum of values on B within cluster B3 is one of the components of the final answer. Based on one of B3's metadata parameter, it is known that that sum equals to 100. Since this is everything we need to know about this portion of data, it is not necessary to decompress cluster A3 or B3.

Cluster A5 is Suspect—some rows satisfy A>6 but it is not known which ones. As a consequence, cluster B5 is Suspect too. It is necessary to decompress both A5 and B5 to determine which rows out satisfy A>6 and sum up together the values over B precisely for those rows. A result will be added to the value of 100 previously obtained for Pack B3, to form the final answer to the query.

Precision Factors

As described above, metadata parameters may generally be effective in improving execution of a database query. A "precision factor" is a measure of a metadata parameter's effectiveness in maximizing efficiency of execution of a database query.

For example, the precision factor for a metadata parameter characterizing column 'A' within a cluster 'X' may be reversely proportional to the following difference:

[maximum A's value in X]−[minimum A's value in X]

"Reversely proportional" may be defined mathematically as, for example:

Exp(−difference); or

1/(difference+1); or

1−(difference/global), where global=[maximum A's value in the whole data]−[minimum A's value in the whole data]

A "difference", as the term is used in the foregoing discussion may be related to homogeneity of some subset of data found in a cluster of records with respect to their values within column A. However, homogeneity, as the term is used herein, is not limited to the formal meaning found in classical statistical approaches to data analysis. For example homogeneity may not be related only to a low standard deviation of the value variations (e.g., the variation of data values in column A over a cluster X). Instead, homogeneity is adjusted to the actual way of using metadata parameters in executing a database query.

For example, a metadata parameter may store the number of NULL values on column A in cluster X. Generally, query execution efficiency is improved to the extent that NULL values are gathered into fewer number of clusters. The precision factor with respect to NULLs may be defined as:

MAX{parameter, 1−parameter}, where parameter=[# of NULLs on $A$ in $X$]/[# of all rows in $X$]

Generally, the above formula provides that a more optimum precision factor is found for a corresponding metadata parameter when clusters have very high or very low percentage of NULLs.

As a further example, where the metadata parameter is a histogram of the column A for cluster X, its precision factor may be even less related to the traditional notion of homogeneity. Referring now to FIG. 1, a range of values of column A in the whole data 101 as well as a shorter range of values of A in cluster X 102 are illustrated. A precision factor for some types of metadata parameters is improved if the internal interval (X) is minimal compared to the external one (whole data). However, where the metadata parameter stores histogram information, its precision factor is improved even if the internal interval is long, but with many "holes" 103 inside it. The "holes" 103 mean that the range between minimum and maximum is not uniformly covered by values in cluster X, more specifically, that the values of A in cluster X occur only within the shaded intervals 104. Because a histogram metadata parameter encodes those shaded intervals by means of a binary sequence, the shorter the overall length of the shaded intervals, the more nearly optimum is the metadata parameter's precision factor.

Clustering Operations

The foregoing description related to determining metadata parameters, and precision factors associated therewith, for a RDB consisting of clusters of records. Characterizing such existing clusters with one or more metadata parameters has been shown to improve efficiency of executing a query on the RDB. The present inventors have found that performing a clustering operation, that is, grouping and/or regrouping of data records within the RDB, may result in substantial additional improvements in query execution efficiency. The improvement arises because data clusters having more "homogenous" values will be better represented by metadata parameters (i.e., the metadata parameters will have a more optimal precision factor). For example, minimum and maximum values will be closer to each other for each cluster. As another example, there will be more 0's inside histograms for clusters of numeric values. As a result, metadata parameters will filter out more clusters when a RDB query is executed. Advantageously, a clustering operation may be performed during load, insert, data compacting, or even while processing intermediate results during query execution.

Figure 2:
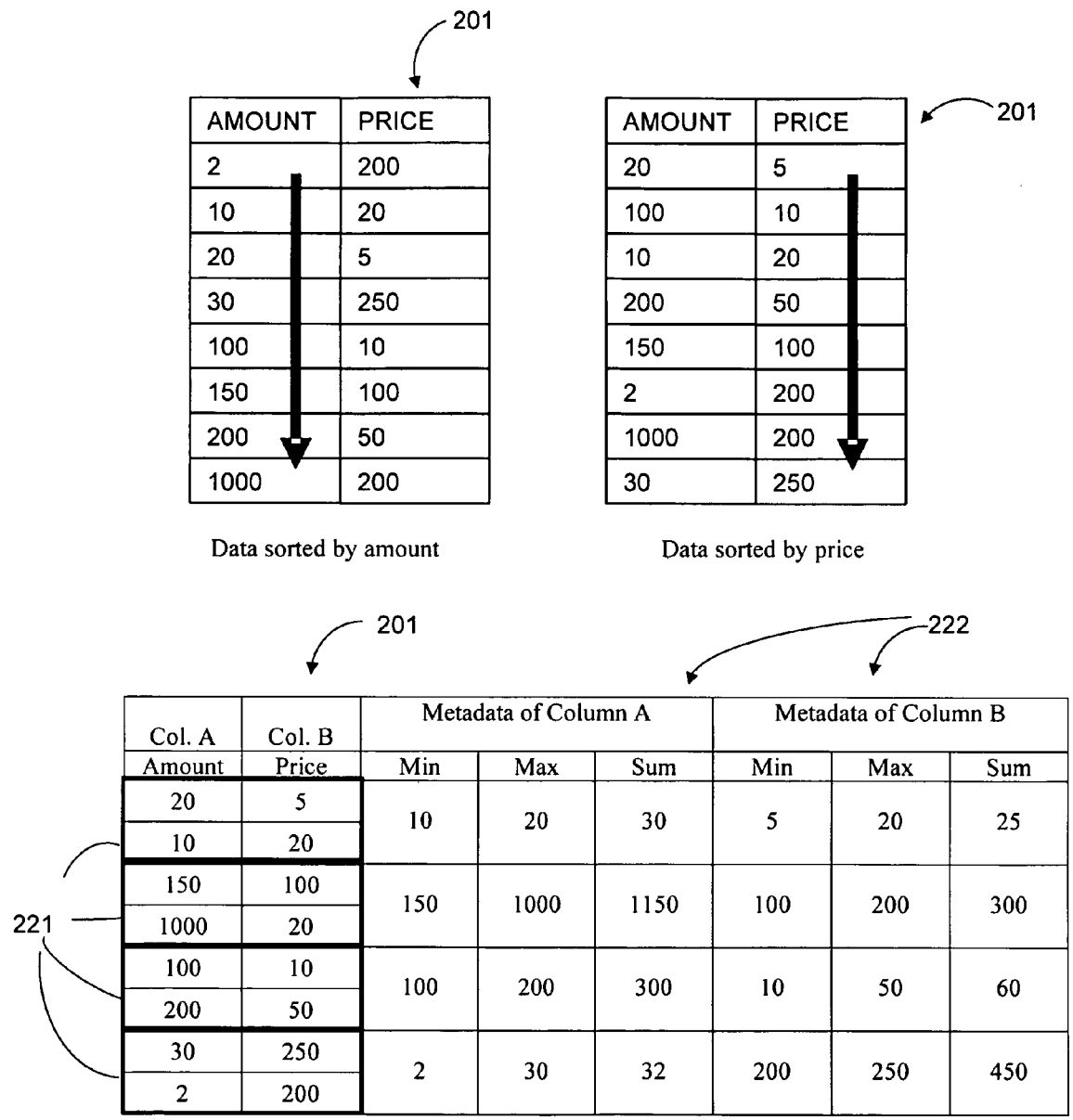
FIG. 2 illustrates a data structure suitable for processing by an embodiment.

Referring now to FIG. 2, an example of data clustering within a simple two column table is provided. Simple sorting by either column destroys regularities in the other column. But inside clusters, values of both columns can be kept relatively homogeneous (for simplicity of illustration, each cluster has two rows).

Figure 3A:
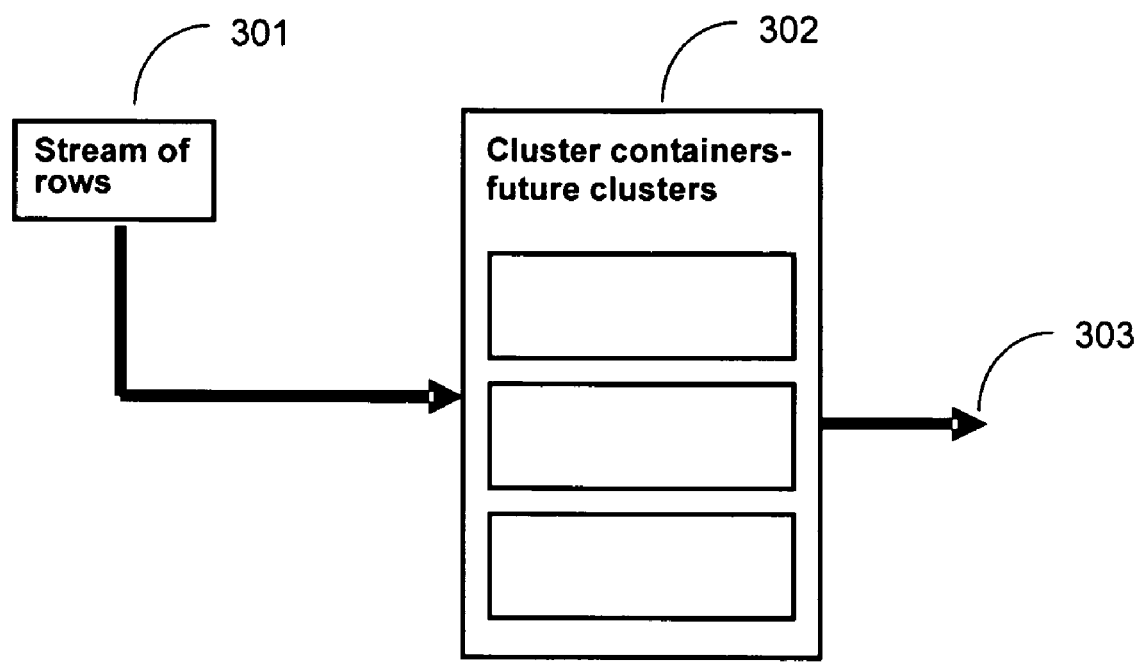
FIG. 3 is an exemplary flow diagram illustrating an embodiment for data clustering.

In an embodiment, a clustering operation may be performed on load, for example upon receipt of a stream of data records (or rows) of an RDB by assigning each record as it arrives to a cluster "container". Each cluster container may have a selectable maximum size, i.e., a capacity for a selectable number of records. In an embodiment, the selected maximum size may be 2^16 records. As illustrated in FIG. 3a, each of a stream of rows 301 may be assigned to a selected cluster container, from a set 302 of cluster containers. As will be described in detail hereinbelow, selection of a "best" cluster container for each respective row may be made so as to optimize an average value of a selected precision factor. For each arriving row of data an embodiment may find the best cluster container to which the row may be added. A "full" container may be replaced with an empty container, and the data within the full container may constitute a finished data cluster 303; data clusters 303 may thereafter be processed within the RDB.

An example of a clustering operation will now be provided with reference to FIG. 4 where a simplified RDB 401 having nine records is illustrated. For purposes of the example, each record will be assigned to one of a set of cluster containers, each cluster container having a capacity to hold four records. The objective of the clustering operation may be to optimize a calculated value of precision factors for selected metadata parameters. In the present example, it is assumed that two metadata types are of interest: MinMax(A) and MinMax(B). For simplicity, the example assumes each metadata parameter to have equal weight. It should be noted, however, that an embodiment provides for non-equal weighting factors to be separately applied to respective precision factors of each metadata parameter. Moreover, each weighting factor may be a default value, a manually set value, and/or an automatically recalculated value during the regrouping step. Automatic recalculation may be performed by applying a weight derived from a previous iteration of the method. Advantageously, at least one of the weighting factors may be selected based on an estimated correlation between its associated metadata parameter and query execution efficiency.

As previously discussed, a precision factor may be calculated according to various mathematical formulations. For purposes of the present example precision factors P(A,X) and P(B,X) are defined as $$P(A, X) = \frac{1}{1 + \text{Max}(A, X) - \text{Min}(A, X)};$$

$$P(B, X) = \frac{1}{1 + \text{Max}(B, X) - \text{Min}(B, X)}.$$

FIG. 5a illustrates the initial state of each cluster container (before assignment of first record R1. The precision factor over an empty cluster container is set by default as equaling 1. Average historical precision changes P(A) and P(B) may be recorded for each of metadata types and updated when each new record is assigned an existing cluster container. At the start of a clustering operation, P(A)=0 and P(B)=0. In the present example, the maximum number of record capacity of each cluster container equals to 4. Whenever a cluster container has been assigned four records, the new data group is created as the algorithm's output and the data bucket is emptied before continuing the algorithm.

When a first record, R1[2, 20], arrives, the result of assigning it to any empty cluster container is the same (the precision factor equals one for a cluster container containing zero data records or a single data record) so the assignment is arbitrary. For this example, it assumed that record R1 is assigned to cluster container X1 as shown in FIG. 5b. When a record arrives, it may be tested for possible assignment in each cluster container (resulting here in three "observations", one with respect to each of three cluster containers).

When second record R2 [1, 2] (and each subsequent record) arrives a decision with respect to cluster container assignment may be made taking into account (1) the metadata precision changes over container X if R is assigned to X and (2) the current number of records in X, denoted as |X|. The second parameter permits, for example, a weighting of how much to rely on the calculated precision change and how to rely on an average historical change instead. A record may be assigned to a cluster container on the basis of a calculated cluster quality parameter D(X,R), where $$D(X,R)=D(X,R,A)+D(X,R,B)$$

$$D(X,R,A)=[P(A,X)-P(A,X+R)]*|X|+P(A)*(4-|X|); \text{ and}$$

$$D(X,R,B)=[P(B,X)-P(B,X+R)]*|X|+P(B)*(4-|X|)$$

and an objective of clustering is to assign records to cluster containers so as to minimize the calculated value of D.

Now, in the case of record R2[1,2]:

$$D(X1, R2) = \left[\left(1 - \frac{1}{1+(2-1)}\right)*1 + 0*(4-1)\right] +$$
$$\left[\left(1 - \frac{1}{1+(20-2)}\right)*1 + 0*(4-1)\right]$$

$$D(X2, R2) = 0 \text{ and } D(X3, R2) = 0$$

The result of assigning R2 to either X2 or X3 is the same (resulting in a D(X,R)=0) and is preferred to assigning R2 to X1. For this example, it assumed that record R2 is assigned to cluster container X2 as shown in FIG. 5c. It may be noted that the number of observations is now six, of which one is non-zero.

The decision calculation upon arrival of third record R3 [30, 1]:

$$D(X1, R3) = \left[\left(1 - \frac{1}{1+(30-2)}\right)*1 + 0.083*(4-1)\right] +$$
$$\left[\left(1 - \frac{1}{1+(20-1)}\right)*1 + 0.158*(4-1)\right]$$

$$D(X2, R3) = \left[\left(1 - \frac{1}{1+(30-1)}\right)*1 + 0.083*(4-1)\right] +$$
$$\left[\left(1 - \frac{1}{1+(2-1)}\right)*1 + 0.158*(4-1)\right]$$

$$D(X3, R3) = 0.083*4 + 1*0.158*4$$

The calculation above determines that D(X3, R3) is the smallest value, so, as a result R3 may be assigned to cluster container X3, with the results summarized in FIG. 5d.

When each of record R4 through R6 arrives, a similar decision calculation is made, with results presented in FIGS. 5e through 5g.

When record R7 is assigned to cluster container X2, in accordance with a decision calculation presented in FIG. 5h, cluster container X2 reaches its full capacity of four records. The data cluster represented by those four records represents an intermediate output reported by the example method, whereafter cluster container 2 is emptied and enabled to accept new arriving records. The results just prior to arrival of record R8 are presented in FIG. 5i.

When each of record R8 and R9 arrives, for example, it is treated in a manner similar to the foregoing with results presented in FIGS. 5j and 5k. Any number of records may be handled in accordance with the method described above.

The foregoing example presented an embodiment in which clustering of records is performed so as to improve a cluster quality parameter calculated as a sum of a weighted first and a weighted second precision factor, each precision factor being associated with a respective first and second metadata parameter. The method may be readily applied to more or fewer precision factors and metadata parameters. In an embodiment, for example, a single metadata parameter and associated selected precision factor is considered, and assignment of records to cluster containers during a clustering operation is made so as to maximize an average value of the selected precision factor. In a further embodiment, a cluster quality parameter may be calculated and optimized based on a sum of several respectively weighted precision factors.

Figure 3B:
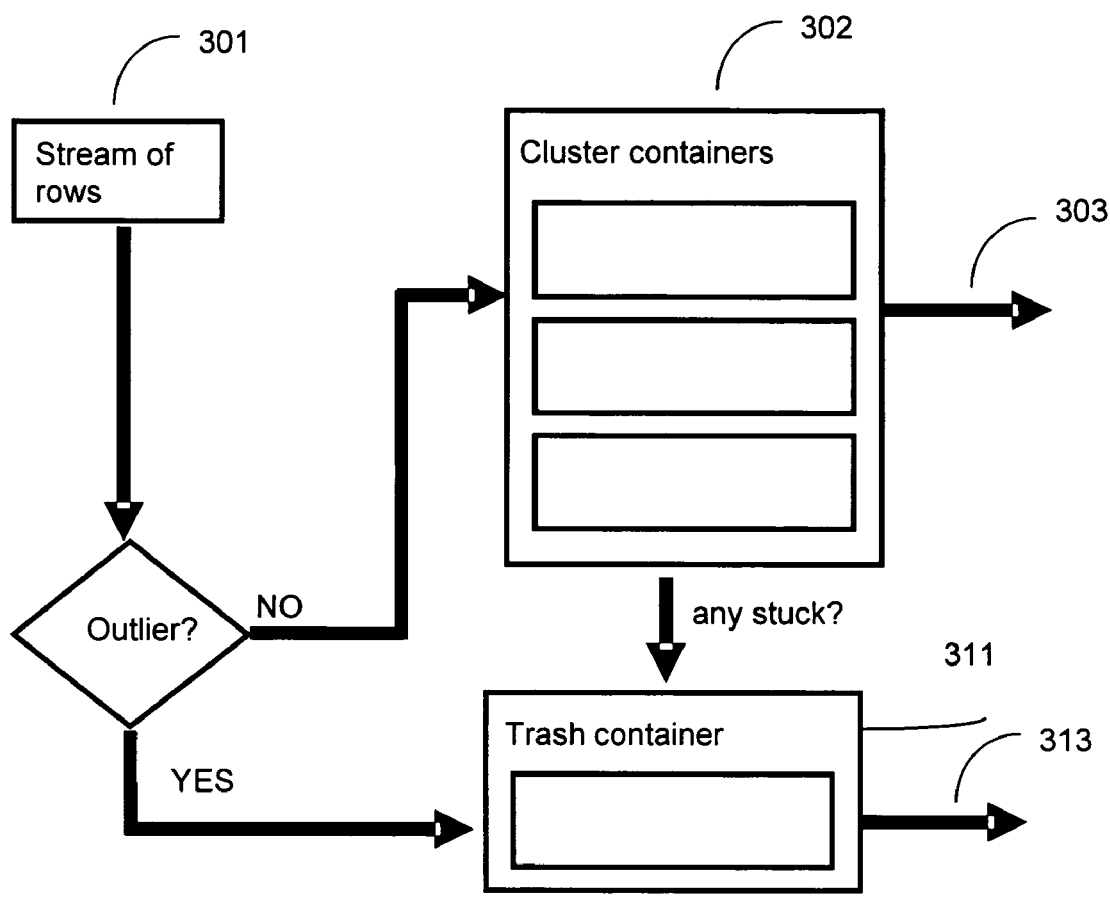

In some embodiments, a cluster container may be designated as a "trash" container. Referring now to FIG. 3b, such a trash container 311 may be designated to gather outliers, i.e., records which do not fit well enough in any other cluster container within set 302. The criteria for classifying a record as an outlier that should be placed in trash container 311 may be based on a history of changes in one or more precision factors obtained as a result of prior assignments of new records to cluster containers. When the result of placing a record in a container other than trash container 311 would be a decrease in the precision factors to a degree sufficiently higher than historical changes to the precision factors, then the record may, instead, be advantageously placed in trash container 311.

In yet a further embodiment, trash container 311 may also gather records already located in another cluster container, when that other cluster container remains unchanged (or, "stuck") during a portion of a clustering operation of a sufficiently large number of records. In such event there may be a high probability that the "stuck" cluster container will remain unchanged and unfinished until the end of the clustering operation, resulting in no clusters produced. In such a case, it may be advantageous to empty the records from the stuck cluster container into trash container 311, with the expectation that such emptied cluster container will work better for the remaining portion of records to be clustered.

A precision factor for clusters 313 resulting from the trash container 311 will usually be very low. However, precision factors of other clusters will likely significantly increase as a result of placing into the trash container 311 the major portion of data from various types of outliers. By judicious selection of criteria for moving records to the trash container 311, a percentage of clusters being moved to the trash container may be kept relatively low, and an improvement of average value of precision factors across the database may be achieved.

Embodiments of the method further provide for adjustment of the size and quantity of cluster containers. For example, a selected quantity of cluster containers may be adjusted downward when speed of executing the method is below a threshold, and adjusted upward when a value of the selected precision factor is below a threshold. Moreover, the quantity of cluster containers may be adjusted based on a weighted function of the speed and the selected precision factor when both are below a threshold.

Other embodiments may include repetition of a clustering operation when a change occurs to the RDB and/or to parameters related to the RDB. For example, a clustering operation may be repeated after a change to an existing record, addition of a record, and/or deletion of a record. As a further example, a clustering operation may be repeated upon occurrence of a change resulting from execution of a database query (e.g., a database query inserting, updating or deleting some records. In addition, a clustering operation may be repeated upon occurrence of a change in value of a metadata parameter resulting from statistics of previously calculated metadata parameters.

Figure 6:
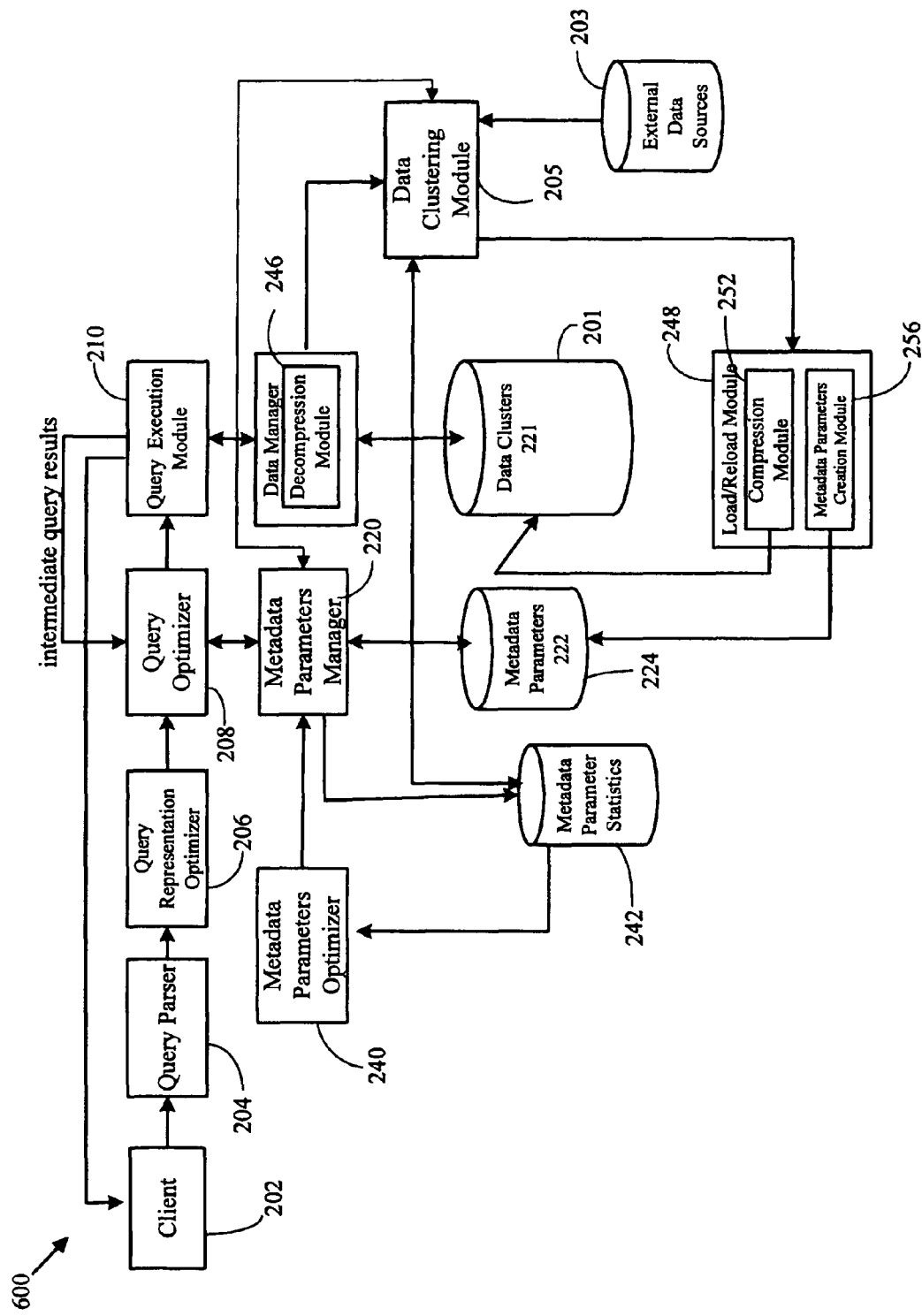
FIG. 6 illustrates a processing arrangement of an exemplary embodiment.

Processing Arrangement;

Referring now to FIG. 6, a processing arrangement 600 for carrying out an embodiment will be described. Processing arrangement 600 is described with reference to functional program modules for the purpose of illustration only. When implemented, one or more of these functional modules may be combined into a single program module or may include two or more sub-modules. Processing arrangement 600 may interface with a client application (also referred to as a client) 202 providing a query tool executed on a user terminal (not shown). Processing arrangement 600 may be coupled to a database storage 201, which may be implemented using SQL (Structured Query Language), and may provide an interface, such as an SQL interface, to query tools for use via the client application 202. The SQL interface may manage the creation and management of database objects like tables, views and user permissions to those tables. Although only one client application 202 is shown, multiple client applications 202 may be connected to the processing arrangement 600. The client application 202 may provide a user interface (not shown) through which SQL requests and responses may be sent and received between the client application 202 and the processing arrangement 600. Processing arrangement 600 may include, for example, a query parser 204, a query representation optimizer 206, a query optimizer 208 and a query execution module 210.

Processing arrangement 600 may also include functional program modules such as: connectors, connection pool, management services and utilities, caches and buffers, a file system, and the like. The functionality of these program modules will be understood by a person of ordinary skill in the art and so will only be briefly described. The connectors may provide various mechanisms/protocols for external tools to connect to the database. The connection pool may manage multiple clients connecting and making requests to the database. The connection pool may manage the concurrency of many requests competing for resources. The management services and utilities are supporting tools that may be used with the data to manage administration, settings, users, and the like. The caches and buffers are lower level services that may be provided to all the system components which manage data in memory (e.g., Random Access Memory (RAM)) for query responses and optimizations among other functions. The file system may manage the storage device.

During or prior to query execution, data records received from external data sources 203 may be clustered by data clustering module 205. During an initial clustering operation (or clustering of new data), for example, data clustering module 205 may receive a data stream from external data sources 203. Alternatively, during a second or other subsequent operation, data clustering module 205 may receive a data from decompression module 246. In performing a data clustering operation, data clustering module 205, interacts with metadata parameter statistics 242 and metadata parameters manager 220. For example metadata parameter statistics 242 may provide data clustering module 205 with information about metadata parameter weighting factors. Moreover data clustering module 205 may optimize a clustering operation based on metadata parameter information provided by metadata parameters manager 220.

Outputs of a completed clustering operation and/or contents from a filled cluster container may be outputted by data clustering module 205 to load/reload module 248. Load/reload module 248 may perform compression, file storage, and recomputation of metadata parameters, for example, and may output the results of these steps to database storage 201.

Database storage 201 may include one or more data clusters 221. In some embodiments, database storage 201 may store a column-oriented database, and the data clusters 221 may each represent column data from a base table. The data clusters 221 may include compressed data representing the records or entries in the respective column. Database storage 201 may provide for partitioning on one or more data storage devices (not shown) such as a hard disk drive (HDD) or other suitable storage medium, which may be a permanent (i.e., non-volatile) storage medium. Depending on the size of a column, the column data may be stored in more than one cluster (e.g., if there are more than 65.5 K records). The data clusters 221 may contain more or less records than discussed here, depending on the application.

Information about data elements in a data cluster 221, such as basic statistical or analytical information, may be stored as a metadata parameter 222 associated with each data cluster 221 in the metadata parameter storage 224. In some embodiments, there may be one metadata parameter 222 for each data cluster 221. Each metadata parameter 222 may contain basic information (e.g., statistics) about some aspects of its respective data cluster 221. The particular information maintained in metadata parameter 222 for each data cluster 221 may depend on the particular type of data within the respective data cluster 221 (e.g., on whether the data consists of alphanumeric strings, numeric, floating point, or binary values). Typically, the size of each metadata parameter 222 may be small and so the metadata parameter 222 may not be compressed. However, if the information contained in metadata parameter 222 becomes more complex or large, metadata parameter 222 may be compressed.

As an example, metadata parameters 222 for data clusters 221 may include: the number of non-null values for at least one column in the respective data cluster 221, the minimum and maximum values for at least one column in the respective data cluster 221, and the sum of values for at least one column in the respective data cluster 221. In the case of non-numerical columns, the lexicographic minimum and maximum or the largest common prefix (e.g., the longest sub-string that is common to all strings) for a data cluster 221 may be stored. If all non-null values for a column in the data cluster 221 are the same, the metadata parameter 222 corresponding to that column may store only statistical information, in which case only the position of nulls may be stored in a file for that column within the cluster. In some embodiments, additional or different information may be included in the metadata parameter 222. Further, other information about the respective data cluster 221 may be derived from the information in the metadata parameter 222. For example, the average value may be derived directly from the number of non-null values and the sum of values which are both stored in the metadata parameter 222.

As previously discussed, metadata parameter 222 may be used in query planning and execution, and may allow minimization of the need to access the data stored in the respective data cluster 221 during query execution, as will be described in more detail below. Metadata parameters may also be used for optimized scheduling of data access by, for example, optimizing the usage of memory buffers, processing the data in a way so as to find query resolution faster, and the like.

Database storage 201 may also have indices based on the data clusters 221 analogous to database indices based on records. Most standard database indices may be adapted for the processing arrangement 600 to be based on the data clusters 221 rather than records.

The processing arrangement 600 may further include a metadata parameter manager 220 and a metadata parameter optimizer 240. The metadata parameter manager 220 may be a functional program module that may manage the metadata parameters 222. The metadata parameter manager 220 works with the query optimizer 208 and metadata parameter optimizer 240. The metadata parameter manager 220 may generate, modify and remove metadata parameters 222 based on instructions from the metadata parameter optimizer 240. The metadata parameter manager 220 may also be responsible for informing the query optimizer 208 about the available metadata parameters 222 and may load them into memory from storage (e.g., HDD) as necessary. When loaded into memory, the query optimizer 208 may use information from the metadata parameters 222 to determine the optimum query execution plan. Once loaded into memory the metadata parameters 222 may also be used in the execution of the query execution plan as will be explained in more detail below.

The metadata parameter optimizer 240 may be a functional program module that may be used to determine an optimum set of metadata parameters 222 based on metadata parameter usage and quality statistics 242 obtained from the metadata parameter manager 220.

Metadata parameter usage and quality statistics 242 may store information about the frequency and/or kind of usage (e.g., relevant, irrelevant, partially relevant) of metadata parameters 222 and data clusters 221. Data cluster usage statistics may influence compression/speed ratios for particular data clusters 221 and influence which data clusters 221 are loaded directly into memory. Metadata parameter usage and quality statistics 242 may also be used to vary the content of the metadata parameters 222 for particular data clusters 221. Moreover, metadata parameter usage and quality statistics 242 may be used to characterize the respective data clusters 221 of the data being queried.

Using the metadata parameter usage and quality statistics 242, the metadata parameter optimizer 240 may update the optimal set of metadata parameters 222. If metadata parameters 222 do not exist over a desired data range, the metadata parameter optimizer 240 may determine that creation of one or more metadata parameters 222 would improve query execution. In this case, the metadata parameter optimizer 240 may instruct the metadata parameter manager 220 to create one or more metadata parameters 222 of a given type (e.g., create a histogram for a given data cluster 221, for a plurality of data clusters 221, or for a column of data consisting of two or more data clusters). If metadata parameters 222 exist over a desired data range (e.g., for a given data cluster 221) but, for example, the metadata parameters 222 cannot be used to answer the most frequent queries over this range, the existing metadata parameters 222 may be modified (e.g., a histogram resolution may be changed) or new metadata parameters 222 may be created in order to provide sufficient statistics to satisfy such queries. In this case, the metadata parameter optimizer 240 may instruct the metadata parameter manager 220 to modify or create the relevant metadata parameters 222. If metadata parameters 222 exist, but the relevant data is infrequently or never queried, and hence the relevant metadata parameter 222 is infrequently or never queried, these metadata parameters 222 may be deleted. In this case, the metadata parameter optimizer 240 may instruct the metadata parameter manager 220 to delete the relevant metadata parameters 222. If such data becomes accessed or queried more frequently in the future, this may be detected by the metadata parameter optimizer 240, which may instruct the metadata parameter manager 220 to start (re)creating relevant metadata parameters 222 if doing so will improve query performance.

The metadata parameter optimizer 240 provides an improved collection of metadata parameters 222, that is, metadata parameters that cooperate with each other in an improved way in resolving queries. For example, two particular metadata parameters may be far more valuable than other metadata parameters. However, it may only be necessary to retain and store one of those two metadata parameters because they usually aid in resolving the same queries with the same data clusters. In such a case, it is possible to store only one of those two best metadata parameters since they are somewhat redundant. Instead of storing the second metadata parameter, it may be beneficial to generate another more complementary metadata parameter that may be helpful with other queries or data clusters.

Query parser 204 may receive SQL queries, sometimes referred to as requests or SQL statements, from client application 202. Query parser 204 parses or separates the SQL query received from the client application 202 and converts it into an internal representation usable by the processing arrangement 600. Query parser 204 may forward this internal representation to query representation optimizer 206.

Query representation optimizer 206 may perform a syntactical optimization of the query. Query representation optimizer 206 replaces any references to views with references to the underlying base tables and reformats the query to attempt to make it easier to execute based on the structure of the query request. Query representation optimizer 206 may forward this optimized representation to the query optimizer 208.

Query optimizer 208 may optimize the query for execution using analytical information from the metadata parameters 222 relating to the underlying data (e.g., column, table, or view described in the original SQL query) provided via the metadata parameter manager 220, and from intermediate query results obtained from the query execution module 210 as will be described in more detail below. The query optimizer 208 may prepare the query for execution by preparing a query execution plan. If intermediate query results are obtained from the query execution module 210, the query optimizer 208 may modify the initial query execution plan based on these intermediate results. The query optimizer 208 may forward the initial and any modified query execution plans to the query execution module 210 for execution.

Query execution module 210 may execute the initial and any modified query execution plans provided by query optimizer 208. Query execution module 210 may also be coupled to the metadata parameter manager 220 so as to provide access to the analytical information of the metadata parameters 222 for use in answering the query. Query execution module 210 may, if the query cannot be resolved solely from the basic and/or advanced analytical information in the metadata parameters 222, use retrieved data from storage (e.g., HDD) by decompressing the relevant data clusters 221 in the database storage 201 using a decompression module 246. A file system (not shown) may be responsible for storing and retrieving data from data clusters 221 in storage and compressing or decompressing the data clusters 221 as required.

The processing arrangement 600 may further include load/reload module 248. Load/reload module 248 may receive data clusters 221 from data clustering module 205. As part of the encoding/decoding operation, the data in the data clusters 221 may be compressed by the compression module 252 in the load/reload module 248. The load/reload module 248 may also produce metadata parameters by way of metadata creation module 256 in the load/reload module 248.

The database content and metadata may be stored in several types of files: (1) column description files; (2) data cluster description files; (3) data files; and (4) metadata parameter description files. Column description files contain a description of the column which may include: its data type, metadata parameter information, and data cluster localization.

In some embodiments, there are data cluster description files in addition to the column description files, in which case the column description files may contain information on the data type and basic statistics of the column (e.g., information as to whether each record has a unique value, a dictionary of values if a column has small number of distinct values, or others), and the data cluster description files may contain metadata parameter information.

The data files contain the compressed column data. The data files may be stored with the column description file, although they may be stored in a different location (e.g., different storage device, etc.). In some aspects, the data files may be limited to 2 GB in size, or some other suitable size depending on the application. When reading data from a data cluster 221, the file system may only need to decompress the parts of the data files associated with data elements related to the values of the relevant column in the relevant data cluster 221.

The metadata parameter description files store information about the metadata parameters 222. Each metadata parameter description file describes a separate metadata parameter 222, allowing individual metadata parameters 222 to be created, modified, or removed by the metadata parameter manager 220 without affecting other objects, such as other metadata parameters 222. This may improve the ability to manage (e.g., by creation or deletion of metadata parameters 222) the metadata parameters 222 of the database 201. The metadata parameter description files may be stored on the same or different storage device (e.g., HDD) as the column description files and data files. The metadata parameter description files are loaded into memory on the first use of the metadata parameters 222, however the metadata parameter manager 220 may load and remove metadata parameters 222 from memory in accordance with usage of such metadata parameters 222. The metadata parameter description files are not necessary for data decoding, and may therefore be lost or restored at any time.

All of the data files may be subject to memory management. Once the column metadata (e.g., column description files), data cluster 221 or metadata parameter 222 is loaded into memory, it may be kept in memory as long as it is being used, and may be kept by the memory manager for future use. When the available memory becomes low, the less used objects may be removed from memory, as managed by the metadata parameter manager 220.

Thus, a method of organizing a RDB to perform a clustering operation on records of the RDB has been disclosed, whereby a number of clusters are created, at least one of which being characterized by a selected metadata parameter, and the clustering operation optimizes a calculated value of a selected precision factor for the selected metadata parameter.

Embodiments of the present invention involve computer software and hardware, for example in the form of servers, point of sale terminals, personal computers, mobile computer-based devices, mobile phones, and the like. Such devices and software generally execute algorithms which implement methods that are embodiments of the present invention. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

The present invention can be implemented with apparatus to perform the operations described herein. This apparatus may be specially constructed for the required purposes, or may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

Thus, methods and systems for optimizing the organization of a relational database so as to improve the efficiency of executing search queries on the database have been described.

What is claimed is:

1. A method of organizing data in a data processing system, data in the data processing system including a plurality of individual data elements arranged in at least one table having columns and rows, each of the data elements corresponding to a row and column, said method comprising:
grouping a plurality of the rows of the at least one table into a row unit, wherein the at least one table comprises a plurality of row units, and wherein a data unit corresponds to the row unit and a column, wherein each data unit comprises a plurality of data elements; gathering information about each data unit and storing the information in a corresponding information unit, and using the information in the information units to minimize the number of data unit access requests during resolving the data queries received by the system; and using a processing arrangement to perform a clustering operation on the rows to create the plurality of row units, each of the row units characterized by information units gathering information about corresponding data units, records to create a plurality of clusters, at least one of said plurality of clusters characterized by a selected metadata parameter, wherein said clustering operation optimizes a calculated value of a selected precision factor for the selected information unit, the selected information unit is selected to minimize the number of data unit access requests during resolving the data queries received by the system, and the selected precision factor is related to efficiency of using the selected information unit to minimize the number of data unit access requests during resolving the data queries received by the system metadata parameter.

2. The method of claim 1, wherein the selected information unit is used to minimize the number of data unit access requests during resolving the data queries received by the system.

3. The method of claim 1, wherein the selected information unit characterizes a corresponding data unit by identifying at least one of:
- a minimum value of all data elements in the data unit;
- a maximum value of all data elements in the data unit;
- a number of non-null values found within the data elements in the data unit;
- a histogram mapping an occurrence of at least one value in the data unit;
- total value of the data elements in the data unit that provide information about occurrence of a character in an alphanumeric string;
- information about correlation of the data elements in the data unit with at least one data element of at least one other data unit; and
- common occurrence of at least one value in the data unit and in the at least one other data unit.

4. The method of claim 1, wherein, the precision factor comprises a measure of effectiveness of the selected information unit in maximizing efficiency of using the selected information unit to minimize the number of data unit access requests during resolving the data queries received by the system.

5. The method of claim 1, wherein the clustering operation comprises a first clustering operation and a second clustering operation, wherein said second clustering operation is performed only when said second clustering operation is predicted to improve the value of the selected precision factor by at least a selected threshold amount.

6. The method of claim 1, further comprising repeating the method when a change occurs to at least one of the relational database and parameters related to the relational database.

7. The method of claim 6, wherein the change comprises at least one of a change to an existing record, addition of a record, deletion of a record.

8. The method of claim 6, wherein the change comprises a change in value of at least one of an information unit, a precision factor, a weighting factor, and a cluster quality parameter.

9. The method of claim 8, wherein the change in value results from executing a database query.

10. The method of claim 8 wherein the change in value is based on statistics of previously created information units.

11. The method of claim 1, wherein performing a clustering operation comprises: assigning a first record to a first cluster container, said first cluster container being one of a selected number of cluster containers; assigning each subsequent record to a selected one of (a) the first cluster container and (b) a different cluster container, said selection being made to maximize an average value of the selected precision factor.

12. The method of claim 11, further comprising:
adjusting the selected number of cluster containers in response to at least one of (i) a speed of executing the method and (ii) the selected precision factor average value.

13. The method of claim 11, wherein each cluster container has a selectable maximum size and further comprising adjusting, responsive to at least one calculated value of a precision factor of said cluster container, the selected maximum size of said data container.

14. The method of claim 13, wherein, when a total number of records assigned to a cluster container corresponds to the selectable maximum size of the cluster container, a data cluster is formed from said records, and said cluster container is emptied and enabled to be assigned additional subsequent records.

15. A method of organizing a relational database having a plurality of records, said method comprising using a processing arrangement to perform a clustering operation on the records to create a plurality of clusters, at least one of said plurality of clusters characterized by a selected metadata parameter, wherein said clustering operation optimizes a calculated value of a selected precision factor for the selected metadata parameter, wherein the clustering operation comprises a first clustering operation and a second clustering operation, wherein said second clustering operation is performed only when said second clustering operation is predicted to improve the value of the selected precision factor by at least a selected threshold amount, and wherein the selected metadata parameter is a first selected metadata parameter and the at least one of said plurality of clusters is characterized by the first selected metadata parameter and a second selected metadata parameter, wherein the selected precision factor is a first selected precision factor for the first metadata parameter and a second selected precision factor for the second metadata parameter; the first selected metadata parameter has a first weighting factor applied to the first selected precision factor and the second selected metadata parameter has a second weighting factor applied to the second selected precision factor; a cluster quality parameter comprises a sum of the weighted first selected precision factor and the weighted second selected precision factor; and each of the first and second clustering operations improves the cluster quality parameter.

16. The method of claim 15, wherein each of the first weighting factor and the second weighting factor is at least one of (i) a default value, (ii) a manually set value, (iii) automatically recalculated during the regrouping step.

17. The method of claim 15, wherein a value of at least one of the first weighting factor and the second weighting factor is selected based on an estimated correlation between said associated metadata parameter and query execution efficiency.

18. The method of claim 15, wherein at least one of the first weighting factor and the second weighting factor is automatically recalculated by applying a weight derived from a previous iteration of the method.

19. The method of claim 18, wherein:
- at least one calculated value of at least one of the first selected precision factor and the second selected precision factor is recorded; and
- at least one of the first weighting factor and the second weighting factor is automatically recalculated while performing the second clustering operation using a statistical value derived from the corresponding at least one recorded first selected precision value and second selected precision value.

20. The method of claim 15, wherein performing a clustering operation comprises: assigning a first record to a first cluster container, said first cluster container being one of a selected number of cluster containers; assigning each subsequent record to a selected one of (a) the first cluster container and (b) a different cluster container, said selection being made to improve the cluster quality parameter.

21. A method of organizing a relational database having a plurality of records, said method comprising using a processing arrangement to perform a clustering operation on the records to create a plurality of clusters, at least one of said plurality of clusters characterized by a selected metadata parameter, wherein said clustering operation optimizes a calculated value of a selected precision factor for the selected metadata parameter, wherein performing a clustering operation comprises assigning a first record to a first cluster container, said first cluster container being one of a selected number of cluster containers; assigning each subsequent record to a selected one of (a) the first cluster container and (b) a different cluster container, said selection being made to maximize an average value of the selected precision factor; and adjusting the selected number of cluster containers in response to at least one of (i) a speed of executing the method and (ii) the selected precision factor average value, and wherein the quantity of cluster containers is adjusted at least one of downward when the speed is below a threshold, upward when the value of the selected precision factor is below a threshold, and based on a weighted function of the speed and the selected precision factor when both are below a threshold.

22. A method of organizing a relational database having a plurality of records, said method comprising using a processing arrangement to perform a clustering operation on the records to create a plurality of clusters, at least one of said plurality of clusters characterized by a selected metadata parameter, wherein said clustering operation optimizes a calculated value of a selected precision factor for the selected metadata parameter, wherein performing a clustering operation comprises assigning a first record to a first cluster container, said first cluster container being one of a selected number of cluster containers; assigning each subsequent record to a selected one of (a) the first cluster container and (b) a different cluster container, said selection being made to maximize an average value of the selected precision factor, and wherein said selection is made to improve a cluster quality parameter, said cluster quality parameter comprising a product of a weighting factor and the selected precision factor, said weighting factor corresponding to an average historical value of the selected precision factor.

23. A method of organizing a relational database having a plurality of records, said method comprising using a processing arrangement to perform a clustering operation on the records to create a plurality of clusters, at least one of said plurality of clusters characterized by a selected metadata parameter, wherein said clustering operation optimizes a calculated value of a selected precision factor for the selected metadata parameter, wherein performing a clustering operation comprises assigning a first record to a first cluster container, said first cluster container being one of a selected number of cluster containers; assigning each subsequent record to a selected one of (a) the first cluster container and (b) a different cluster container, said selection being made to maximize an average value of the selected precision factor, and wherein said selected number of cluster containers comprises a designated trash container and said step of assigning each subsequent record comprises assigning each subsequent record to a selected one of (a) the first cluster container, (b) the trash container, and (c) a different cluster container.

24. The method of claim 23, wherein a record is assigned to the trash container when a result of assigning said record to any other container is found to decrease the average value of the selected precision factor more than a threshold amount.

25. The method of claim 23, wherein, when a total number of records assigned to a cluster container remains unchanged during a portion of a clustering operation, said portion exceeding a specified number of records, said cluster container is emptied and said total number of records is moved to the trash container.

26. A method of organizing data in a data processing system, data in the data processing system including a plurality of individual data elements arranged in at least one table having columns and rows, each of the data elements corresponding to a row and column, said method comprising grouping a plurality of the rows of the at least one table into a row unit, wherein the at least one table comprises a plurality of row units, and wherein a data unit corresponds to the row unit and a column, wherein each data unit comprises a plurality of data elements; gathering information about each data unit and storing the information in a corresponding information unit, and using the information in the information units to minimize the number of data unit access requests during resolving the data queries received by the system; and (i) duplicating a plurality of records in said relational database to create at least a first and a second plurality of records, said first plurality of records being identical to said second plurality of records; (ii) performing a first clustering operation on each of the first plurality of records and second plurality of records to create a first plurality of clusters and a second plurality of clusters, each said cluster in the plurality of clusters characterized by at least one respective metadata parameter, each respective metadata parameter having an associated precision factor, each said associated precision factor having a respective weighting factor applied thereto, wherein said first clustering operation maximizes a calculated value of a weighted selected precision factor; and, responsive to a database query, (iii) executing said database query on a selected one of the first plurality of records and second plurality of records, said selection being made on the basis of a correlation between a property of the query and the calculated value of the selected precision factor for each of said first plurality of records and second plurality of records.

27. A method of executing a query of data in a data processing system, the data in the data processing system including a plurality of individual data elements arranged in at least one table having columns and rows, each of the data elements corresponding to a row and column, said method comprising grouping a plurality of the rows of the at least one table into a row unit, wherein the at least one table comprises a plurality of row units, and wherein a data unit corresponds to the row unit and a column, wherein each data unit comprises a plurality of data elements; gathering information about each data unit and storing the information in a corresponding information unit, and using the information in the information units to minimize the number of data unit access requests during resolving the data queries received by the system; and using a processing arrangement to perform a clustering operation on the rows to create the plurality of row units, each of the row units characterized by information units gathering information about corresponding data units records wherein said clustering operation optimizes a calculated value of a selected precision factor for the selected information unit, the selected information unit is selected to minimize the number of data unit access requests during resolving the data queries received by the system, and the selected precision factor is related to efficiency of using the selected information unit to minimize the number of data unit access requests during resolving the data queries received by the system metadata; using the selected information unit to minimize the number of data unit access requests during resolving the data queries received by the system at and returning a response to the query.

28. A computer-readable medium having computer readable instructions stored thereon for execution by a processor to perform a method of organizing data in a data processing system, data in the data processing system including a plurality of individual data elements arranged in at least one table having columns and rows, each of the data elements corresponding to a row and column, said computer-readable medium including computer readable instructions directed to grouping a plurality of the rows of the at least one table into a row unit, wherein the at least one table comprises a plurality of row units, and wherein a data unit corresponds to the row unit and a column, wherein each data unit comprises a plurality of data elements; computer readable instructions directed to gathering information about each data unit and storing the information in a corresponding information unit, and using the information in the information units to minimize the number of data unit access requests during resolving the data queries received by the system; and computer readable instructions directed to performing a clustering operation on the rows to create the plurality of row units, each of the row units characterized by information units gathering information about corresponding data units records to create a plurality of clusters, at least one of said plurality of clusters characterized by a selected metadata parameter, wherein said clustering operation optimizes a calculated value of a selected precision factor for the selected information unit, the selected information unit is selected to minimize the number of data unit access requests during resolving the data queries received by the system, and the selected precision factor is related to efficiency of using the selected information unit to minimize the number of data unit access requests during resolving the data queries received by the system metadata.

* * * * *